(12) United States Patent
Drimer

(10) Patent No.: US 7,429,926 B1
(45) Date of Patent: Sep. 30, 2008

(54) RADIO FREQUENCY IDENTIFICATION (RFID) AND PROGRAMMABLE LOGIC DEVICE (PLD) INTEGRATION AND APPLICATIONS

(75) Inventor: Saar Drimer, Santa Cruz, CA (US)

(73) Assignee: Xilinx, Inc., San Jose, CA (US)

( * ) Notice: Subject to any disclaimer, the term of this patent is extended or adjusted under 35 U.S.C. 154(b) by 203 days.

(21) Appl. No.: 11/185,257

(22) Filed: Jul. 20, 2005

(51) Int. Cl.
*G08B 13/14* (2006.01)

(52) U.S. Cl. .............. 340/572.7; 340/572.1; 340/572.4; 340/572.8; 340/539.1; 340/568.2; 340/653; 340/10.51

(58) Field of Classification Search .............. 340/572.1, 340/572.7, 572.8, 539.1, 505, 652, 653, 654, 340/10.51, 14.61, 568.2, 572.4; 235/375, 235/376, 385, 492; 455/418, 425
See application file for complete search history.

(56) References Cited

U.S. PATENT DOCUMENTS

| | | | |
|---|---|---|---|
| 5,719,586 A * | 2/1998 | Tuttle | 343/726 |
| 5,973,598 A * | 10/1999 | Beigel | 340/572.1 |
| 6,480,110 B2 * | 11/2002 | Lee et al. | 340/572.5 |
| 6,512,482 B1 | 1/2003 | Nelson et al. | |
| 6,873,842 B2 | 3/2005 | Elayda, III et al. | |
| 7,088,288 B1 | 8/2006 | Margolese et al. | |
| 7,142,557 B2 | 11/2006 | Dhir et al. | |
| 7,256,751 B2 * | 8/2007 | Cohen | 343/792.5 |
| 2006/0087883 A1 * | 4/2006 | Ozguz et al. | |

OTHER PUBLICATIONS

Xilinx, Inc.; U.S. Appl. No. 11/185,118, by Ballagh et al. filed Jul. 20, 2005.
Pete Sorrelis; "Passive RFID Basics" AN680; Microchip; 1998 Microchip Technology Inc.; DS00680B; downloaded on Feb. 27, 2007 from http://ww1.microchip.com/downloads/en/AppNotes/00680b.pdf; pp. 1-7.
Roy Want; "The Magic of RFID"; vol. 2, No. 7; Oct. 2004; downloaded on Feb. 27, 2007 from http://www.acmqueue.com/modules.php?name-Content&pa=showpage&pid=216&page=1; pp. 1-10.
Alex Goldman et al.; "RFID Primer: Where the WLAN Hits the RFID Fan"; WI-Fi Planet; Dec. 23, 2003; downloaded on Feb. 27, 2007 from http://www.wi-fiplanet.com/tutorials/article.php/3292521; pp. 1-10.

* cited by examiner

*Primary Examiner*—Hung T. Nguyen
(74) *Attorney, Agent, or Firm*—Thomas A. Ward; Michael T. Wallace

(57) ABSTRACT

A Programmable Logic Device (PLD), such as a Field Programmable Gate Array (FPGA), is provided with components of a Radio Frequency Identification (RFID) tag and circuitry to enhance operation. The RFID antenna and circuitry is provided in either directly in layers of the die forming the PLD, on a die package containing the PLD die, or on a printed circuit board containing the PLD. An RFID antenna provides a source of power from an external electromagnetic radiation source (such as an RFID reader) during storage of the PLD to prevent loss of decryption software in volatile memory should batteries run down. The RFID antenna can further provide a path for providing a bitstream to program the PLD as well as to read data to verify programming. With multiple PLDs having RFID antennas, programming of the PLDs can be performed in parallel. Further, the RFID antenna can be used with limited PLD resources to identify the PLD for inventory.

10 Claims, 3 Drawing Sheets

RADIO FREQUENCY IDENTIFICATION (RFID) AND PROGRAMMABLE LOGIC DEVICE (PLD) INTEGRATION AND APPLICATIONS

BACKGROUND

1. Technical Field

The present invention relates to a Radio Frequency Identification (RFID) tag circuitry and antenna used in combination with a Programmable Logic Device (PLD).

2. Related Art

Radio Frequency Identification (RFID) is a method of remotely storing and retrieving data and identification using devices called RFID tags (or RFID transponders). RFID tags contain antennas to enable them to receive and respond to radio-frequency queries from an RFID transceiver. An RFID tag can be attached to or incorporated into a product, such as by placing the RFID tag in an adhesive sticker attached to the product.

FIG. 1 shows an RFID reader antenna 2 and a tag antenna 4, illustrating use of a loop antenna used to form both the RFID tag and the RFID reader. As illustrated, the antennas 2 and 4 operate similar to a transformer to magnetically couple the antennas when one of the loops, in the case of the reader antenna 2, is energized with an alternating current to creating a magnetic field shown by dashed lines 3. The tag loop antenna 4 acts like the secondary of a transformer by extracting energy from he magnetic field 3 created. The tag antenna 4 is connected to a tuning capacitor 5 and circuitry 6 for communicating an identification signal to the reader. Although shown as loop antennas, the antennas 2 and 4 can take other forms as long as the magnetic coupling 3 occurs.

FIG. 2 shows an equivalent circuit for the RFID tag along with the RFID reader antenna. The RFID reader antenna creates an inductance 12 that is coupled with the RFID tag antenna. The tag antenna also produces a resistance 8. The tag antenna inductance 14 is connected in parallel with a tuning capacitor 5. The tag antenna inductance 14 and tuning capacitor 5 are then further connected in parallel with RFID tag communication circuitry 6. The tuning capacitor 5 is sometimes integrated with the tag circuitry 6.

RFID tags were introduced in the 1940s, but small size components were needed to make them effective, preventing any significant use until the 1980s. Even smaller components for the RFID tags since the 1980s have recently increased the use of RFID tags.

RFID tags can be either active or passive. Passive RFID tags do not have their own power supply. The minute electrical current induced in the tag antenna from the incoming radio-frequency scan provides enough power for the tag to send a response. Due to power and cost concerns, the response of a passive RFID tag is necessarily brief: typically just an ID number. Lack of its own power supply makes the device quite small. As of 2004, the smallest passive devices commercially available measured 0.4 mm×0.4 mm, and are thinner than a sheet of paper. Passive tags have practical read ranges that vary from about 10 mm up to about 6 meters.

Active RFID tags, on the other hand, must have a power source, and may have longer ranges and larger memories than passive tags, as well as the ability to store additional information sent by the transceiver. In 2004, the smallest active tags are about the size of a coin and have a range greater than 10 meters.

As passive tags are much cheaper to manufacture and do not depend on a battery, the vast majority of RFID tags in existence are of the passive variety. As of 2004 tags cost from US $0.40. The aim is to produce tags for less than US $0.05.

As of 2004, there are four different kinds of tags commonly in use. They are categorized by their radio frequency: low frequency tags (between 125 to 134 kilohertz), high frequency tags (13.56 megahertz), UHF tags (868 to 956 megahertz), and microwave tags (2.45 gigahertz).

Low-frequency RFID tags are commonly used for animal identification, and automobile key-and-lock systems, and electronic toll collection. With a paper thin size RFID tag, animal or pet identification is provided by embedding small chips in the pet so that they may be returned to their owners if lost. Electronic toll collection using the RFID tags is provided by California's FasTrak and Illinois' I-Pass system. The information is used to debit the toll from a prepaid account. The system helps to speed traffic through toll plazas.

High-frequency RFID tags are used in library book tracking, building and employee access control, and apparel item tracking. These badges need only be held within a certain distance of the reader for authentication. Even higher frequency UHF RFID tags are commonly used commercially in cargo container and truck trailer tracking in shipping yards. Microwave RFID tags are used in long range access control for vehicles.

A PLD, such as a Complex Programmable Logic Device (CPLD) or a Field Programmable Gate Array (FPGA), typically provides significantly more circuitry than a conventional circuit connected to an antenna to create an RFID tag. A PLD, however, provides a programmable circuit that can be configured to adapt to various user needs. The complexity and size of the PLD has in the past prevented its use with an RFID tag.

For reference, a block diagram of conventional components of one type of PLD, an FPGA, is shown in FIG. 3. The FPGA includes input/output (IOBs) blocks 22 (each labeled 10) located around the perimeter of the FPGA, multi-gigabit transceivers (MGT) 24 interspersed with the I/O blocks 22, configurable logic blocks 26 (each labeled CLB) arranged in an array, block random access memory 28 (each labeled BRAM) interspersed with the CLBs, configuration logic 32, configuration interface 34, on-chip processor 36 and an internal configuration access port (ICAP) 30. The FPGA also includes other elements, such as a programmable interconnect structure which interconnects the various programmable elements (e.g., MGT, CLB, BRAM, IOB, and the like) and a configuration memory array, which are not illustrated in FIG. 3. Although FIG. 3 shows a relatively small number of I/O blocks 22, CLBs 26 and block RAMs 28 for illustration purposes, it is understood that an FPGA typically includes many more of these elements.

In general, the FPGA of FIG. 3 is programmed in response to a set of configuration data values that are loaded into a configuration memory array of the FPGA. The internal configuration memory cells define how the CLBs 26, IOBs 22, BRAMs 28 and interconnect structure are configured. Configuration data is provided to the configuration memory cells as a bitstream from an external memory (e.g., an external PROM or PC) via configuration interface 34 and configuration logic 32. The configuration interface 34 can be, for example, a parallel select map interface, a JTAG interface, or a master-serial interface. As another alternative, the FPGA can be reconfigured by rewriting data in the configuration memory array using the ICAP 30.

With user needs for a configurable or programmable circuit, such as a PLD, increasing, as well as the needs for RFID circuitry increasing, a way of combining features of a PLD with an RFID tag is desirable.

SUMMARY

According to embodiments of the present invention, components of an RFID tag are connected to a PLD to provide power to components of the PLD for operation. The RFID antenna can be: (1) formed in layers of the die where the PLD is formed, (2) formed on or provided in a chip carrier or die package containing the PLD die, or (3) provided on a PCB containing the PLD chip with the antenna connecting to an input/output port of the PLD for communications. Power provided through the RFID interface in some embodiments can limit battery power consumption to assure critical code stored in BRAM is not lost while the PLD is unpowered in storage. The RFID components can further provide an interface for programming of the PLD and read back of its content to verify programming and other parameters. The RFID interface to the PLD can further provide for identification of the PLD for inventory control as well as secure access to the PLD. The RFID interface to a PLD may also provide enough energy to completely power the PLD, thus not requiring the need for other power sources in normal and other modes of operation.

With PLDs shipped in a container or stored for long periods of time, one concern is that the batteries powering the BRAM storing encryption software will run out of power rendering the PLD inoperable. In one embodiment of the present invention PLDs in a storage container are connected with RFID antennas, and the storage container for the PLDs contains an RFID reader providing electromagnetic energy to power BRAMs of the PLDs to prevent battery drain during long term storage.

In a further embodiment, the RFID tag enables the PLD to be programmed and data to be read from the PLD for program verification. The RFID antenna is connected to an input where programming signals are provided and sufficient electromagnetic energy is applied with a bitstream of data to program the PLD. Data can similarly be read from the PLD using the RFID antenna to verify programming. With encrypted data, the data read can be provided through decryption circuitry programmed in the PLD using the RFID antenna. In production and other settings, many devices can be programmed in parallel with identical configuration bitstreams and thus save valuable time.

In a further embodiment, the RFID antenna can be connected to the PLD with minimal circuitry of the PLD providing for identification, similar to a conventional RFID tag. For secure access to the PLD, activation for identification can be provided only with a proper encryption signal from the reader. The PLD can operate to provide identification without requiring additional power beyond what is required by the RFID circuitry and what is supplied by the RFID reader. Battery power may be used allowing the PLD to provide authentication schemes such as IFF (identification friend or foe) or SHA (Secure Hash Algorithm.)

Another embodiment of the present invention includes an apparatus comprising, an Integrated Circuit (IC) having a plurality of programmable elements and a programmable interconnect structure interconnecting the plurality of programmable elements, and a RFID antenna connected to the IC.

BRIEF DESCRIPTION OF THE DRAWINGS

Further details of the present invention are explained with the help of the attached drawings in which.

DETAILED DESCRIPTION

Figure 1:
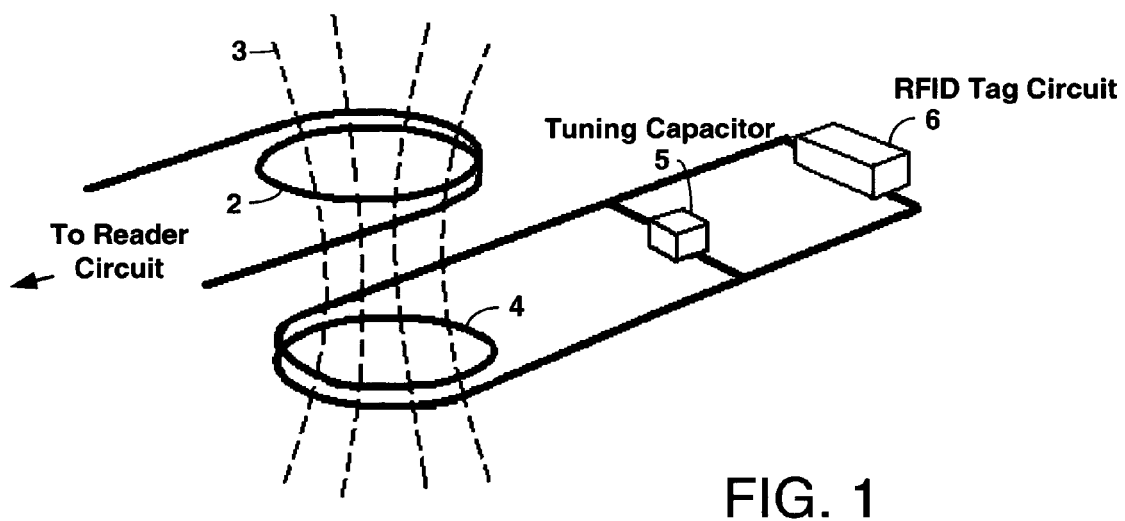
FIG. 1 shows an RFID reader antenna electromagnetically coupled with an RFID tag.
Figure 2:
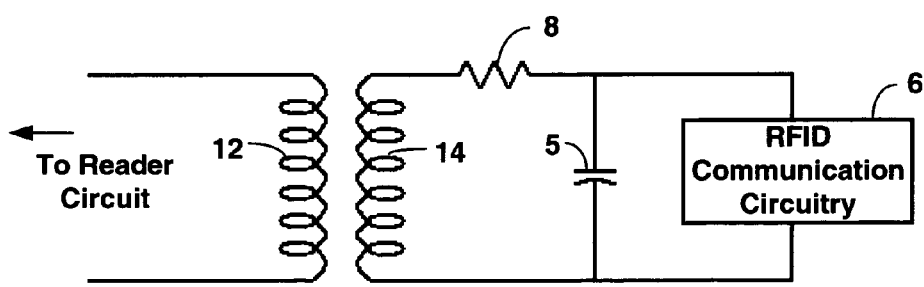
FIG. 2 shows an equivalent circuit for the RFID tag and RFID reader antenna.
Figure 3:
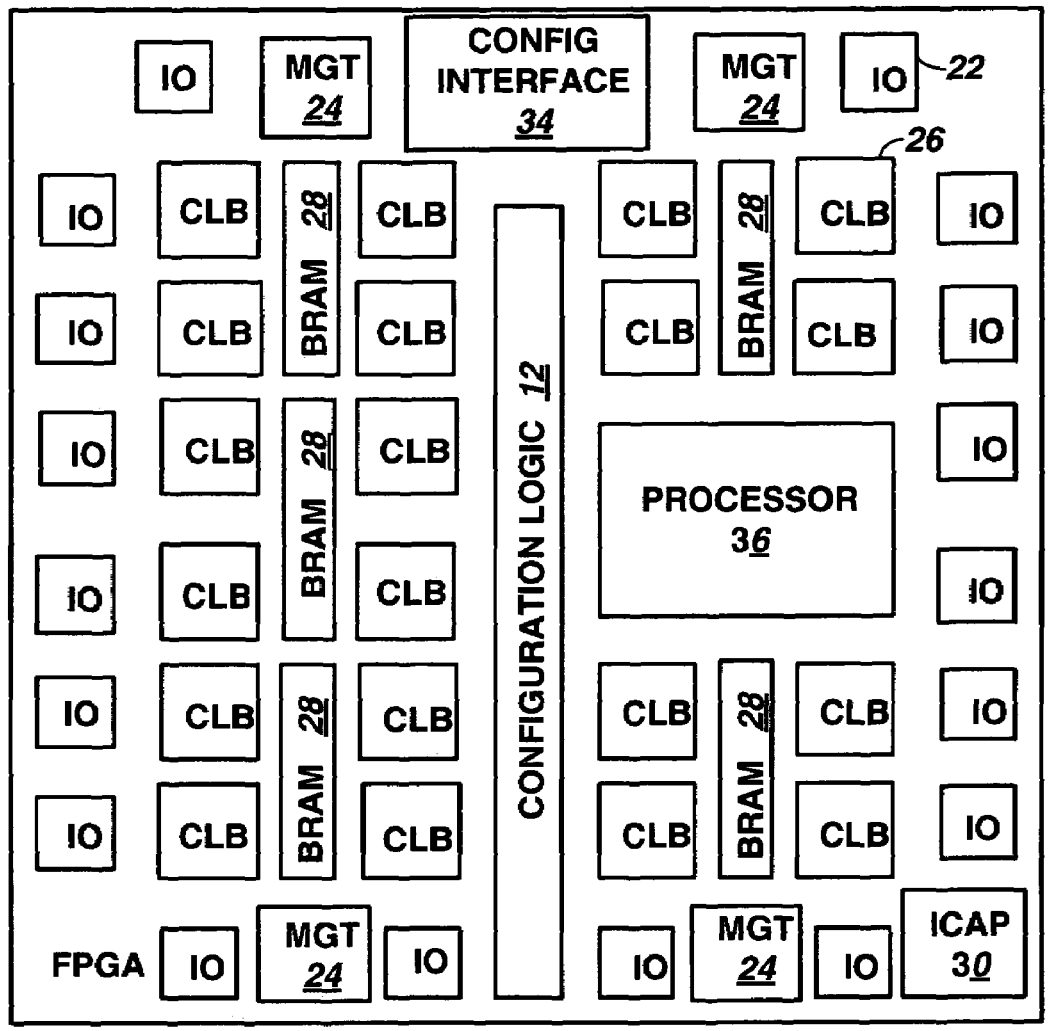
FIG. 3 shows a block diagram of typical components of an FPGA.
Figure 4:
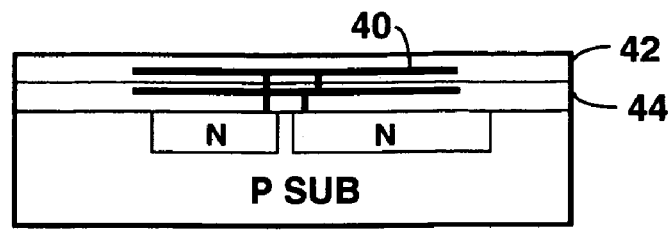
FIG. 4 shows an RFID antenna provided on a layer of a semiconductor containing an PLD.
Figure 5:
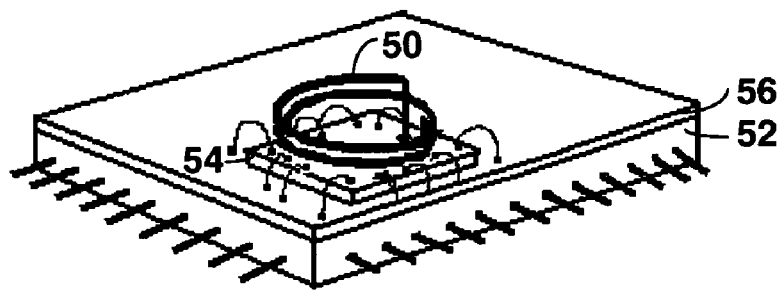
FIG. 5 shows an RFID antenna provided on a chip carrier for an PLD.
Figure 6:
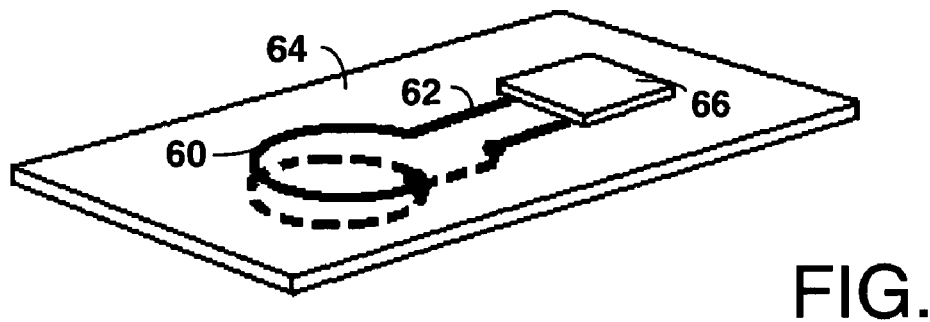
FIG. 6 shows and RFID antenna provided on a PCB with a PLD.

FIGS. 4-6 illustrate how components of an RFID tag can be combined with a PLD, such as a CPLD or an FPGA. The passive tag needs an antenna and simple circuit to communicate. FIG. 4 illustrates how the RFID tag antenna 40 can be formed in one or more metal layers 42 and 44 of the semiconductor die where the PLD is formed. The antenna 40 loops are interconnected with vias to, for example, n-doped areas in a p substrate, and further are connected to an electrical connection to provide signals to internal components of the PLD.

FIG. 5 illustrates how the antenna 50 can be provided on a chip carrier or die package 52 containing the PLD die 54. The antenna 50 can be wire bonded to leads of the PLD die 54 to electrically connect to internal components of the PLD. The antenna 50 can be formed on the lid 56 of the package 52, or formed separate from the chip carrier and attached to the PLD die 54 inside the package 52.

FIG. 6 further illustrates how the RFID antenna 60 can be connected to a Printed Circuit Board (PCB) 64 containing the PLD 66. The antenna 60 is then linked by traces 62 in the PCB 64 to the PLD 66. The loop antenna 60 includes two loops on either side of the PCB 64, with the bottom loop shown in dashed lines, the loops being interconnected by vias.

Although more than one loop is shown in FIGS. 4-6 forming the antenna, either a single loop or more than one loop can be used. For multiple loops, vias are used to interconnect the loops between layers. Similarly, although loop antennas are shown in FIGS. 4-6, it is understood that other antenna types can be used to couple electromagnetic energy to the PLD. In FIGS. 4-6, the RFID can be connected to any input/output port that enables providing communication signals, or programming signals to the PLD. In one embodiment, the antenna can be linked to a power supply input of the PLD.

In addition to simple identification information, the RFID tag used in combination with the PLD circuitry provides a number of applications for the PLD that are described in the following sections.

I. Powering Memory Cells that Store a Decryption Key

As indicated previously, one of the main concerns of customers of PLDs that use bitstream encryption is the use of the battery to backup volatile memory, such as the memory cells of an FPGA, that store the decryption key(s). Customers are concerned that while their product is waiting for use (in a warehouse, or on the shelf), the battery may lose power and render the product inoperable. This concern is addressed by powering the volatile memory cells using an RFID antenna. In storage or in transit, an RFID miniature coil or antenna is attached to all devices on their printed circuit boards. A reader or transmitter of the right frequency can be placed nearby to supply the power needed. Once the PLDs are deployed, the continuing support of the key memory is provided by the battery by removing the RFID coil or antenna supplying electromagnetic field energy. To power the volatile memory cells, since the RFID antenna provides minimal power, in one embodiment the RFID antenna is connected to one or more ports configured to direct power to the volatile memory cells storing the critical decryption key(s).

II. Program and Readback of PLDs Using RFID

By embedding or fixing an antenna coil to the PLD, one can remotely and wirelessly program and read back the content of the PLD. This is especially useful for production environment where many PLD devices need to be configured or programmed. The method enables parallel programming which cuts production time. The RFID antenna is connected to the configuration interface, such as through the ICAP on an FPGA, or any other means to accomplish programming. The RFID reader is combined with necessary programming circuitry and transfers a programming bitstream to the RFID tag antenna through an electromagnetic field. The RFID reader further includes circuitry to read data through the RFID tag antenna for program verification.

This could be extended to encryption and decryption of the bitstream wirelessly. For example, an encrypted bitstream can be sent to the PLD to program through the on chip decryptor (if and only if in the PLD is the correct one). If a program needs to be verified, a command can be issued to read back the PLD contents through a port on the PLD with an on chip encryptor, so that the read back bits are kept secure.

Such wireless configuration management removes the need to connect physically to every assembly in the production line. Elimination of cables and connections speeds up the programming and verification process, and removes a major source of unreliability from the process (breakage and ESD issues).

III. Wireless Product Identification and Authentication

RFID may be used for identification purposes by querying the PLD for its unique ID. This would enable faster processing in warehouses or with inventory control. The circuitry will be powered by the reader and therefore, the PLD need not be powered, similar to a classic RFID tag use model. The RFID antenna can be attached to an input/output port, such as the IOB port of an FPGA, or any other communication port connecting serially to minimal circuitry configured or programmed for identification purposes. With basic information further stored on the PLD die in the form of volatile or non-volatile (eFuse) technology, an authentication challenge-response (such as IFF or SHA) mechanism could be conducted wirelessly. Integrating RFID into or with the PLD will, thus, enable wireless access to information stored on the PLD in a non-secure, or secure mode. It will also enable non-secure, or secure wireless configuration and authentication of the PLD that would be useful in a production setting.

IV. RFID Power Supply for PLD

In one embodiment, sufficient electromagnetic energy can be supplied from an RFID reader to an RFID antenna interface to a PLD to power the device without requiring an additional power supply. With such a configuration, the RFID antenna can be connected to a power supply input pin of the PLD. The power supplied by the RFID mechanism may supply sufficient energy to power the PLD during a special RFID power mode, or even during normal operation.

Although the present invention has been described above with particularity, this was merely to teach one of ordinary skill in the art how to make and use the invention. Many additional modifications will fall within the scope of the invention, as that scope is defined by the following claims.

What is claimed is:

1. An apparatus comprising:
a Programmable Logic Device (PLD);
a radio frequency identification (RFID) antenna connected to an input/output port of the PLD enabling wireless communication with the PLD, wherein the radio frequency identification antenna is formed by a plurality of interconnected metal layers embedded and is coupled to doped regions within a semiconductor die where the programmable logic device is formed; and
one or more vias extending between the plurality of interconnected metal layers and the doped regions to couple the radio frequency identification antenna to the semiconductor die.

2. The apparatus of claim 1, wherein wireless communication with the PLD is provided through the RFID antenna enabling communication through the RFID antenna without requiring power from another source.

3. The apparatus of claim 1, wherein the PLD comprises a Field Programmable Gate Array (FPGA).

4. The apparatus of claim 3, wherein the input/output port of the programmable logic device includes an input/output block of the field programmable gate array.

5. The apparatus of claim 4, wherein the radio frequency identification antenna is adapted to provide access to information stored within the field programmable gate array in response to an authentication challenge received by the radio frequency identification antenna.

6. The apparatus of claim 1 wherein when electromagnetic signals are provided from a reader to the RFID antenna, no further power is required by the PLD to enable communication with the PLD for purposes of identification.

7. The apparatus of claim 1, wherein the input/output port of the programmable logic device includes a power supply input pin of the programmable logic device.

8. The apparatus of claim 7, wherein the radio frequency identification antenna is adapted to receive electromagnetic energy from a source external to the programmable logic device, the radio frequency identification antenna being further adapted to provide operational power to the power supply input pin of the programmable logic device in response to receiving the electromagnetic energy.

9. The apparatus of claim 1, wherein the input/output port of the programmable logic device includes a configuration interface of the programmable logic device.

10. The apparatus of claim 9, wherein the radio frequency identification antenna is adapted to receive a programming bitstream through an electromagnetic field, the radio frequency identification antenna being further adapted to transfer the programming bitstream to the configuration interface in response to receiving the programming bitstream from the electromagnetic field.

* * * * *